United States Patent [19]

Walters et al.

[11] 4,066,545
[45] * Jan. 3, 1978

[54] BILGE WATER DISPOSAL SYSTEM INCLUDING OIL RECOVERY MEANS

[75] Inventors: Chester H. Walters, St. Louis; Harold J. Barmeier, Jr., Ballwin, both of Mo.; Greig E. Sullivan, Marshalltown, Iowa

[73] Assignee: National Marine Service, Incorporated, St. Louis, Mo.

[*] Notice: The portion of the term of this patent subsequent to Apr. 19, 1994, has been disclaimed.

[21] Appl. No.: 709,456

[22] Filed: July 28, 1976

Related U.S. Application Data

[62] Division of Ser. No. 530,539, Dec. 9, 1974, Pat. No. 4,018,683.

[51] Int. Cl.² .............................................. B01D 1/14
[52] U.S. Cl. ........................................ 210/71; 114/187; 210/83; 210/86; 210/142; 210/152
[58] Field of Search ............. 60/310; 114/183 R, 187; 159/1 RW, 4 A, 47 WL; 210/71, 73, 83, 86, 98, 104, 114, 125, 138–140, 142, 152, 187, 513, 533

[56] References Cited

U.S. PATENT DOCUMENTS

| | | | |
|---|---|---|---|
| 1,586,449 | 5/1926 | Jones | 210/152 X |
| 1,608,571 | 11/1926 | Watson | 210/152 X |
| 1,816,573 | 7/1931 | Ellis et al. | 210/152 X |
| 3,253,711 | 5/1966 | Young | 210/83 |
| 3,509,999 | 5/1970 | Reid et al. | 210/152 X |
| 3,615,227 | 10/1971 | Rydberg et al. | 210/83 X |
| 3,628,660 | 12/1971 | In't Veld | 210/125 X |
| 3,731,490 | 5/1973 | Sargent et al. | 210/152 X |
| 3,775,978 | 12/1973 | Body | 210/152 X |
| 3,833,943 | 9/1974 | Sturtevant | 210/152 X |
| 3,836,000 | 9/1974 | Jakubek | 210/104 |
| 3,852,960 | 12/1974 | Essenpreis et al. | 210/152 X |
| 3,882,799 | 5/1975 | Sargent et al. | 210/152 X |
| 3,925,827 | 12/1975 | Wagenhals | 210/152 X |
| 4,018,683 | 4/1977 | Walters et al. | 210/71 |

FOREIGN PATENT DOCUMENTS 230,665  3/1969  U.S.S.R. .................... 114/183 R

Primary Examiner—Wilbur L. Bascomb, Jr.
Assistant Examiner—Robert H. Spitzer
Attorney, Agent, or Firm—Bacon & Thomas

[57] ABSTRACT

An environmentally protective bilge water disposal system utilizes an inverted dome gravitational oil separator unit in combination with an engine exhaust flash water vaporizor to remove and recover oil contamination from the bilge water prior to its disposal by flash evaporation in the exhaust stack. The system is capable of operating continuously under regulation by an electrical control arrangement that ensures safety of the engine, and shutting down of the system if certain key components do not function in a proper manner. The system includes a pump, an oil separator, control valves and sensors for various operating parameters and mechanical functions of the system, such parameters and functions including bilge fluid level, water pump function, water flow valve function, engine fuel pressure, engine throttle air pressure, engine exhaust stack temperature, separator function, separator dome position, and oil storage level. Processed bilge water from which oil contaminant has been removed may be discharged directly overboard the vessel if desired. Recovered oil is stored in a suitable oil storage tank aboard the vessel.

7 Claims, 4 Drawing Figures

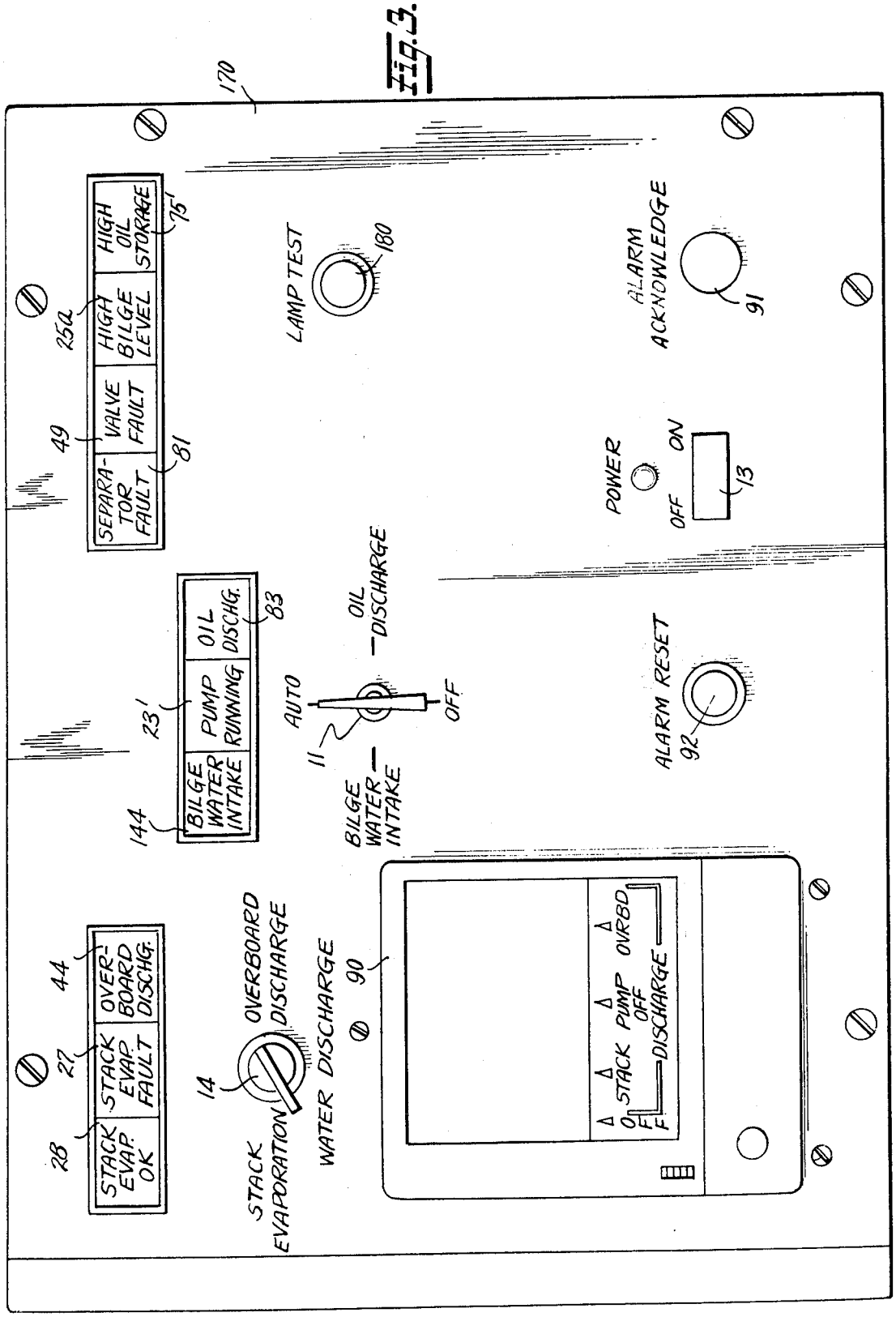

BILGE WATER DISPOSAL SYSTEM INCLUDING OIL RECOVERY MEANS

This is a division, of application Ser. No. 530,539, filed Dec. 9,1974, now U.S. Pat. No. 4,018,683.

BACKGROUND OF THE INVENTION

The present invention relates to a system for disposing of bilge water in marine vessels in a non-polluting, environmentally protective manner, as well as in a safe, automatic and dependable manner with respect to the vessel's operation.

Virtually all larger ships and boats have bilge water in various quantities that must be periodically disposed of. Ship water invariably is contaminated with oil from cargo tank washdowns, engine oil leakage, and other sources, as well as other impurities, such as cleaning compounds (detergents, caustics), cargo leakages, and other such remnants of activities carried out on board the vessel at one time or another during its operation. Previously, and even in present times, the bilge of the vessel is simply pumped out and overboard, resulting in serious contamination of waterways and harbors. To meet this environmental threat, governmental jurisdictions around the world have enacted various legislative mandates against the discharge of water pollutants from vessels, particularly oily contaminants. Since bilge water is a substantial source of such oil contaminants, the need had long been recognized for a system to remove the oil from the bilge water prior to discharge of the water overboard and to enable recovery of the oil itself, a valuable commodity. In known systems, bilge water is cleaned of its oil content by centrifugal systems, gravitational settling tanks, and filters. These systems have their own advantages as well as their shortcomings, depending on operating conditions of the vessels in which they are installed and depending on the nature of the bilge fluids themselves.

It is known, for example, that filtration of oil from bilge water will work well where the oil content of the bilge water is small. However, where substantially pure oil slugs are encountered, filtration becomes a most inefficient and tedious method of cleaning the bilge effluent, since the filter units normally installed on vessels for this purpose are limited in the amount of oil they can remove by their physical size and flowrate capacity. They require constant changing of the filtration screens or cartridges when the units have reached their limits of oil removal ability, and such limits are reached quickly when a substantial amount of oil is contained in the bilge water. Since such filter changes must be done by a ship maintenance man or crew, and since most filtration systems shut down the filter unit automatically when their capacity is reached, the cost in terms of man hours and filter units is substantial.

The inventor and assignee of the present application are aware that previous efforts to separate oil from bilge water include such systems as shown in U.S. Pat. No. 1,586,449 to Jones, as well as U.S. Pat. No. 1,921,689 to Meurk, and more recent Patent No. 3,425,556 to Volker. Still other prior art examples are seen in U.S. Pat. No. 1,406,950 to Fackert and U.S. Pat. No. 1,425,289 to Robinson. They are also aware of a floating dome-type oil-water separation unit such as described in U.S. Pat. No. 3,628,660 to in'tVeld.

Applicant and assignee are also aware of previous efforts to dispose of human waste products on vehicles or vessels by burning or evaporating the waste products using the engine of the vehicle or vessel as the heat source, particularly the exhaust manifold or stack. U.S. Pat. Nos. Re.26,891, U.S. Pat. No. 3,504,797, 3,615,010 and others issued to James S. Reid and assigned to Standard Products Company of Cleveland, Ohio are illustrative of waste water evaporative systems using the exhaust manifold of an internal combustion engine as the heat source. The following patenst show additional illustrations of systems known in the prior art for disposing of human waste water through vaporization thereof in the exhaust stream of the internal combustion engine of a vehicle: U.S. Pat. Nos. 2,565,720, 3,731,490, and 3,740,773.

The inventor is unaware, however of any prior art usage of a bilge water disposal system using a floating dome oil separating unit for removing oil contaminant from the bilge water in combination with an exhaust stack vaporizor for disposing of the water thus separated from the oil in a fully automatic and continuously operating manner under the control of a sophisticated regulation arrangement that ensures safe operation of the system at all times. The present invention has grown out of the recognition that such a system is needed in the maritime field, and, as will be set forth in detail below, represents a unique and marked advance in the art.

The floating dome oil separator referred in herein is shown in two of its basic formats in the above-mentioned U.S. Pat. No. 3,628,660 as well as in British Pat. No. 1,212,553 published Nov. 18, 1973, the latter being based on a convention priority application in the Netherlands, now Netherlands Pat. No. 137,121 dated Mar. 16, 1973. The present invention incorporates means responsive to the position of the dome to shut the bilge disposal system down until the oil accumulated in the separator has been discharged in a particular manner as will be described in detail below, the oil discharge phase of operation also backwashing with clean water the oil coalescing screens used in the separator to further clean the bilge water being procesed before its discharge to the engine exhaust evaporator or overboard the vessel. An automatically regulated inverted dome-type oil-water separator with a pneumatic control system is commercially available from Hydrovac Systems International, Inc., Rockefeller Plaza, New York City, 10020, and is used in many applications for separating heavier and lighter fluid constituents. Separators of this type are especially advantageous aboard ship since they are relatively insensitive to ship motion or entrained gases or solids, fully enclosed, operable over a range of 0-100% oil to water ratio, operable with oils up to about 0.975 specific gravity, operable at virtually any temperature above freezing, and processed water can be discharged routinely with 10 parts per million (PPM) or less oil. In addition, an inverted dome oil separator of this type is especially adaptable for use in the fully automated bilge water disposal system of the present invention since it can be readily modified in accordance with the present invention to cooperate with an engine exhaust stack evaporator system to enable automatic, continuous bilge water disposal under a wide range of conditions.

SUMMARY OF THE INVENTION

The present invention relates to a bilge water disposal system, including means for separating oil from the bilge water before disposal of the water. Bilge water including oil contamination is drawn by suction into a hermetically sealed floating dome oil separator of the type shown in U.S. Pat. No. 3,628,662. As described in this patent, oil is separated from the inflowing bilge mixture of oil and water, with the separated oil accumulating under the top of the floating dome of the separator due to the different specific gravities of the liquids. Depending upon the oil content of the incoming bilge mixture and the specific gravity of the oil, the dome rises quickly or slowly as more or less oil is collected during any span of time. The suction of bilge water into the separator is maintained by pumping processed water from the outlet side of the separator, this water being relatively free of oil contamination. However, since the processed water may still contain small amounts of oil or other dissolved contaminants, overboard discharge of the water is not always desirable and may even be proscribed by law in certain areas. The present invention therefore contemplates disposal of the water by flash evaporation of the water in the hot exhaust stream of an internal combustion engine aboard the vessel.

An elaborate control arrangement is included within the system, and in itself is considered to contribute significantly to the uniqueness of the present invention with respect to the prior art in this field. The control arrangement of the present invention includes means for sensing bilge fluid level, water pump function, water valve flow function, engine fuel pressure, engine throttle air pressure, engine exhaust stack temperature, separator function, separator dome position, and oil storage level. These functions are sensed electrically and electromechanically in most instances resulting in a compact, efficient system that can be designed to utilize solid state electronics to the maximum. The controls are arranged to ensure that bilge water is pumped out under high bilge conditions automatically, with oil being separated from the water and sent to a storage tank automatically at periodic intervals, and with processed water being sent to the stack for vaporization only when the engine is operating at full power and the stack is sufficiently hot to cause instant flash vaporization of the water flowing to the stack. Manual selection of overboard discharge of processed water is available with the present invention, and the system furthermore is designed to continuously monitor its own operation, with interlocks, indicators and alarms being provided to shut the system down, indicate the area of malfunction, and to acoustically alert the maintenance crew when a malfunction occurs.

As will be more completely set forth in the detailed description of the invention, the system embodying the present invention utilizes the self cleaning capacity of the floating dome oil separator to full advantage by drawing processed water from the separator during bilge water disposal operation until the dome is at its high limit (maximum accumulated oil under the dome), and then automatically ceasing the pumping of water from the separator while the separator unit is backwashed with water under positive pressure to discharge the oil under the dome to the storage tank and to clean the coalescing screens provided in the separator of oil particles caught thereon. As the separator fills with water, oil is discharged from the dome, and it drops to its lower limit, which automatically reinitiates pumping operations from the separator if the bilge level is high. The processed water may go to the exhaust stack duct if conditions are right for flash vaporization and selection of this mode of disposal has been made, or may be discharged overboard.

The bilge disposal system herein described still further includes the provision of suitable probes and circuitry for enabling the recordation of various operating conditions of the system along a suitable time graph to provide a record of operation of the system, and in particular when water is discharged through the stack and when it is discharged overboard.

The advantages and distinguishing characteristics of the present invention will become more evident from the detailed description of the invention set forth below.

DETAILED DESCRIPTION OF A PREFERRED EMBODIMENT OF THE INVENTION

Description of the Drawings

FIG. 3 shows a preferred form of control panel used in the present invention.

Figure 1:
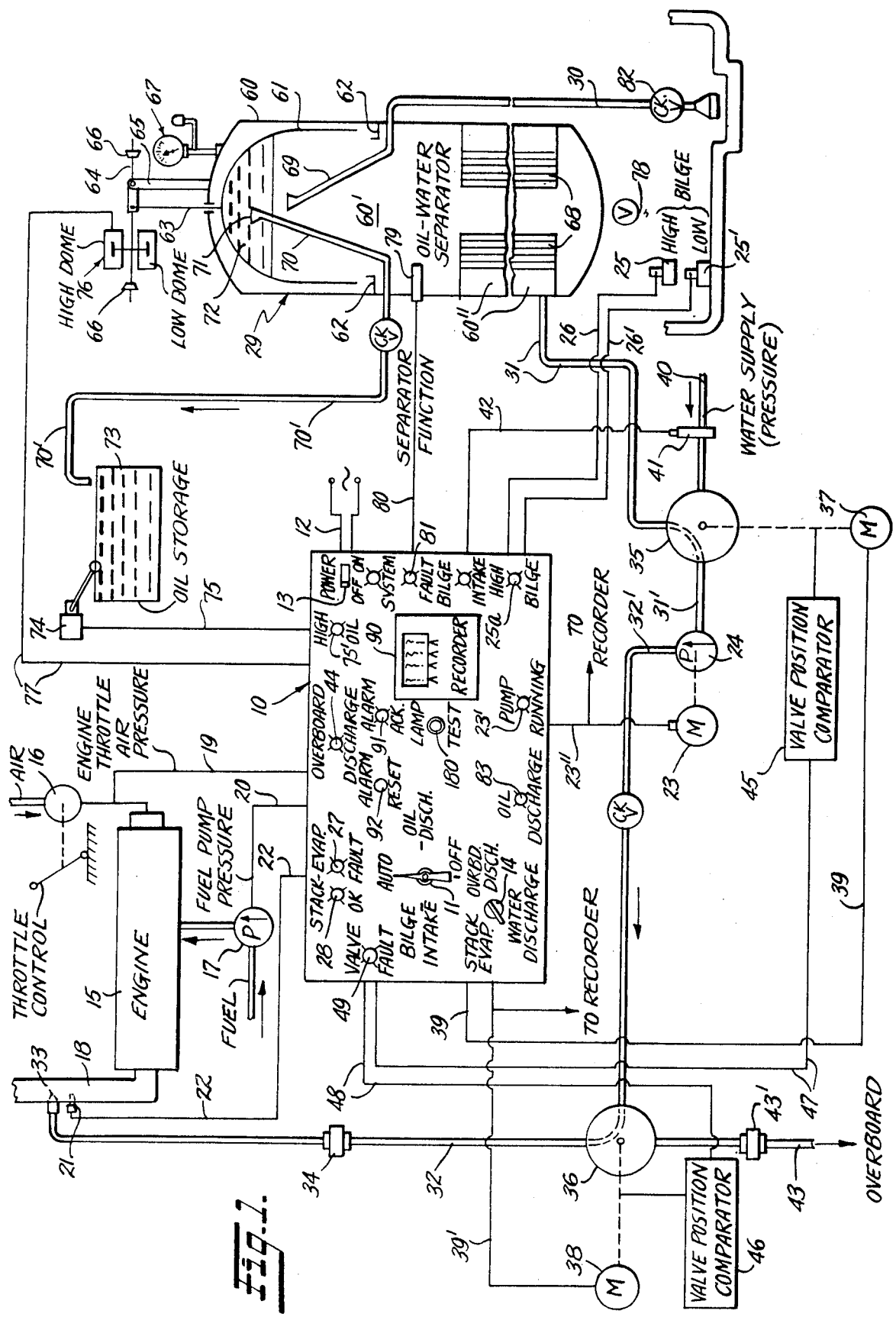
FIG. 1 is a schematic representation of the total bilge water disposal system of the present invention.
Figure 2A:
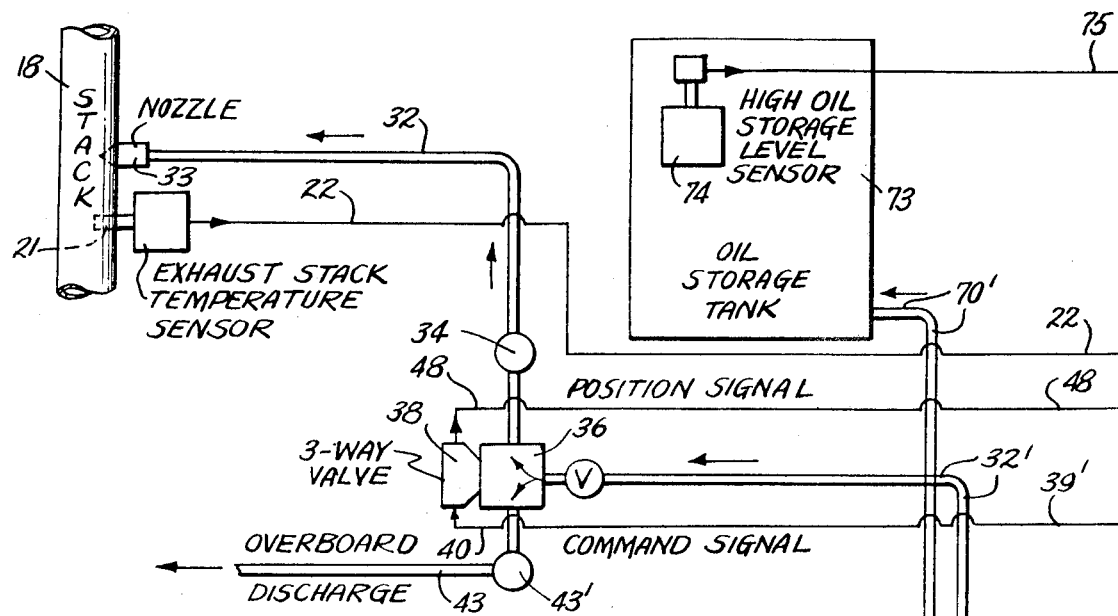
FIGS. 2a and 2b together constitute a schematic diagram of the system of the present invention showing the control and interlock arrangement in more detail.
Figure 2A:
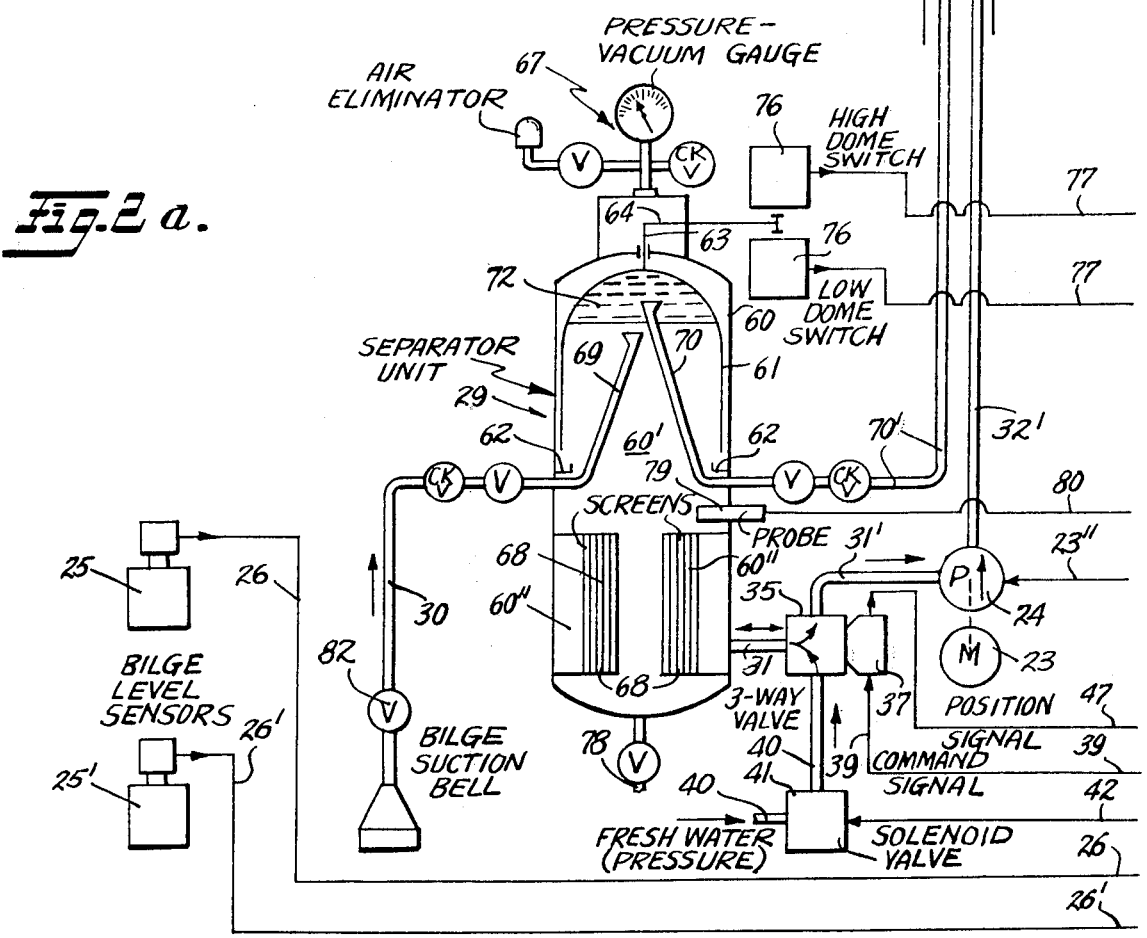
Figure 2B:
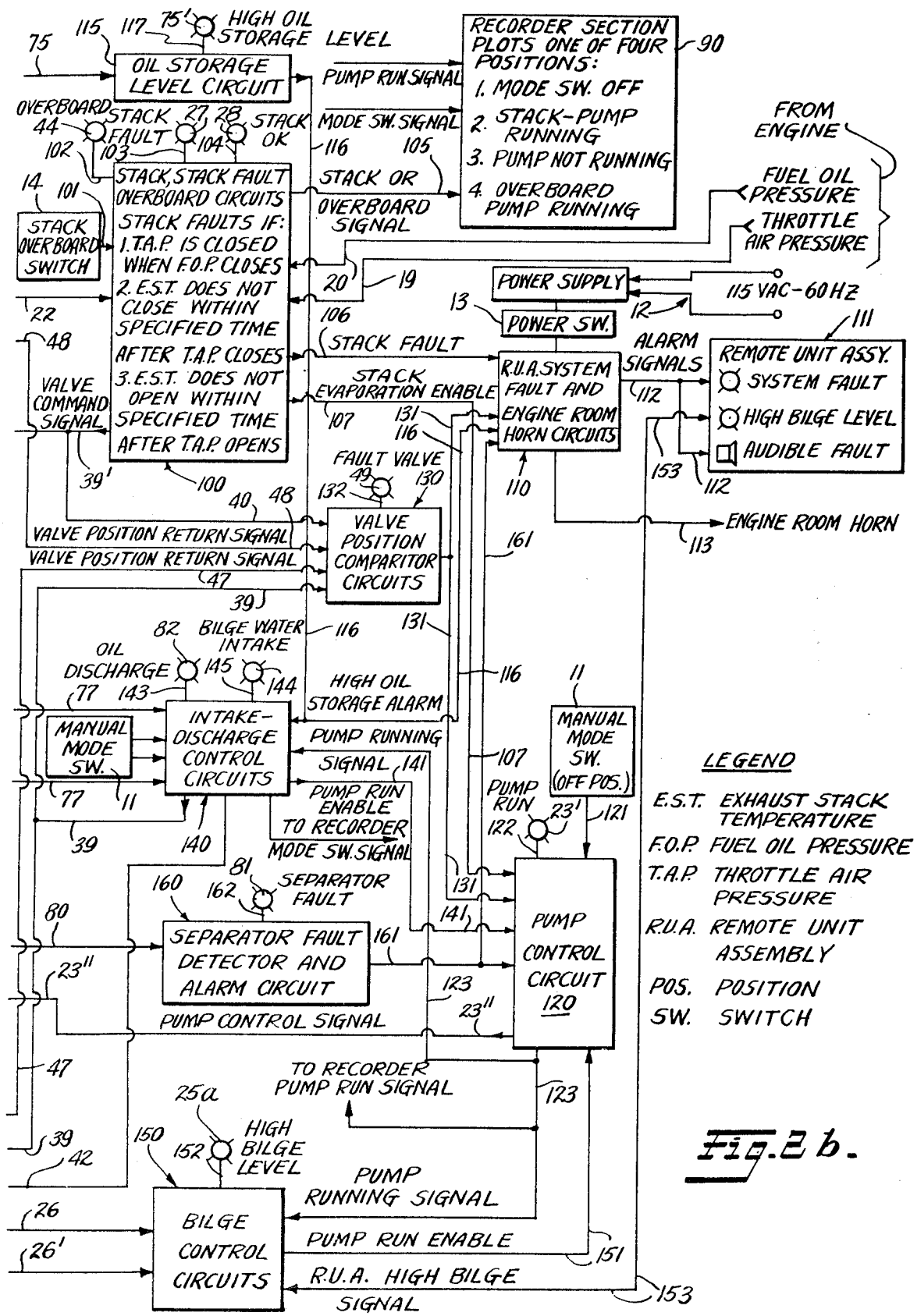

DESCRIPTION OF THE PREFERRED EMBODIMENT:

With reference to FIG. 1, a general view of the functional relationship of the various components making up the system of the present invention is seen. This drawing is intended to convey a visual image of the manner in which the system operates as well as an image of the various components involved, but is not intended to be a picture of the actual structural installation, obviously. Likewise, FIGS. 2a and 2b show the controls of the system in more revealing detail in a schematic manner. FIG. 3, however, is intended to represent a preferred control panel arrangement similar to the control panel contemplated for actual use in the system.

Referring to FIG. 1, the control panel unit 10 includes a circuitry containing box (not shown) behind the panel, and includes on the panel itself a system mode selector knob 11 that enables an operator of the system to select a particular mode of operation of the bilge disposal system of the present invention. A suitable power supply 12 is provided, of course, and a master power switch 13 controls the power supply to the entire system. For purposes of the ensuing description, and unless otherwise denoted, it will be assumed that the power supply is on and the mode selector knob is in the "auto" or automatic mode position. The control panel 10 also includes a water discharge mode selector knob 14, which, as will be seen, enables selection of exhaust duct or overboard discharge of processed water. It will be assumed for the moment that knob 14 is set to the "stack" discharge mode.

In the Description and Claims, the use of the term "bilge water" is intended to denote whatever fluid material is in the bilge area of the vessel. It will be readily apparent to those skilled in the art, however, that the system of the present invention could be used on a vehicle other than a ship and even in a fixed installation environment. In a situation where the system is utilized elsewhere than a ship, the term "bilge water" would be intended to connote whatever mixture is drawn into the separator for further processing.

The term "bilge water" used in connection with the fluid bilge content of a vessel is intended to further encompass any range of oil and water mixture. Normally, a range of 10 to 25% oil in the bilge could be considered normal in a well maintained ship, assuming the vessel is not an oil tanker with cargo tank washdown in the bilge. On the other hand, the oil content of bilge water could rise to an extremely high level to the point where the bilge content is substantially all oil. In some instances, the proportion of oil to water could vary extremely during a relatively short span of time. The system of the present invention is designed with such extremes in mind, and is capable of processing bilge water having virtually any porportion of oil therein on a continuous basis.

The term "oil" is also intended to be broadly considered as any fluid having a specific gravity less than water that can be gravitationally separated from water. The term "processed water" or the term "water" standing alone is intended to mean water from which oil has been separated or substantially oil-free water, generally having less than 10 parts per million oil, although this is not intended to be a limitation in this case.

With knobs 12, 13 and 14 all set in the assumed manner as shown in FIG. 1, the engine 15 is started and, at some point in the ship's operation, will be brought up to full power by setting of the throttle air pressure control 16 which, in the present case, sets the throttle plate of the marine diesel engine 15 in direct proportion to the throttle lever control setting. Engine fuel oil pressure from pump 17 will rise to operating level rapidly upon starting of the diesel engine. Meanwhile, the stack exhaust 18 will increase in temperature up to a relatively predictable and stable value when the engine 15 is operating at full power. The stack temperature under these conditions is normally in excess of 500° F.

The present invention monitors the operation of the engine and senses the stack temperature to determine when stack evaporation of processed water will be allowed and when it will not be permitted. This is done through sensors that measure throttle air pressure at 16 via electrical line 19, engine fuel pressure at 17 via electrical line 20, and stack temperature at 21 via electrical line 22. The engine and stack sensors are electromechanical or electrical and any suitable circuitry well known to those skilled in the art may be used to enable the functioning and utilization of the sensors.

With the engine operating at full power setting and the stack temperature at a minimum predetermined value which will ensure flash vaporization of processed water supplied to the stack at a predetermined flowrate, the operation of water pump motor 23 and pump unit 24 connected to the motor is enabled. That is to say, the pump may not necessarily be turned on yet if there is no processed water to be pumped or if other system functions not requiring operation of the pump are being carried out. However, if pump operation is called for, as will be described below, such as when the bilge level is high, the foregoing described engine and stack sensors perform the function of telling the system that conditions are correct for stack evaporation. Otherwise, if conditions are not correct, with the water discharge mode selector knob 14 set for stack discharge, operation of pump motor 23 is not enabled regardless of high bilge level. This, of course, is to prevent pumping of water to a cold stack or to a hot stack with a slowly turning or shut off engine, or to a stack having insufficient flow of hot exhaust gases. Obviously, such situations would be potentially damaging to the stack and the engine. The movement of system mode knob 11 to a position different than "automatic" will change the effect of the engine and stack conditions on the pump operations, as will be seen later in this description, but the assumption presently is that knob 11 is set for automatic system operation.

With the engine function and stack sensors all enabling operation of the pump for stack evaporation of processed water, the disposal system rests until high bilge level sensor 25 connected to the control unit 10 through line 26 senses bilge fluid in excess of a predetermined level. When this occurs, sensor 25 causes closing of a circuit to pump motor 23 enabling operation of the pump 24, which will immediately begin to operate to draw fluid from the bilge if the engine and stack conditions are correct. Pump running light 23' is lit whenever pump motor 23 is operating. The "high bilge" lamp 25a is lit when sensor 25 detects a bilge level beyond a predetermined level with the pump motor 23 not running. Motor 23 is connected to control unit 10 through electrical line 23". The pump 24 will continue to operate until the fluid level in the bilge drops below a predetermined level as sensed by low bilge sensor 25' connected to the control unit 10 via electrical line 26'.

A stack evaporation indicator includes signal lights 28, 28. When the stack is at its proper flash evaporation temperature, and engine conditions are proper, the "stack evap. O.K." lamp 28 is lit; if conditions are not proper, as will be more fully explained below, the "stack evap. fault" lamp 27 is illuminated.

The oil-water separator 29 in the system is connected to the intake side of pump 24 through processed water line 31, 31'. The intake side of the separator 29 is connected to the bilge pipe 30 which extends into the bilge area 30' of a vessel. Normally, the separator 29, lines 30 and 31, and pump 24 are first filled entirely with water from a suitable supply source so that the system between the pump and bilge is entirely primed. Thus, it will become evident that operation of pump 24 will draw processed water from the separator 29 and that simultaneously bilge water will be drawn up into the separator through line 30 due to the pressure differential set up by the pump between the bilge and the pump. A suitable filter screen (not illustrated) is normally provided in the foot of pipe 30 to keep debris and larger solids out of the separator 29. Suitable check valves in the lines 30 and 31 are also normally provided to maintain the prime of the system.

The outlet side of pump 24 is connected to water lines 32, 32' which lead to stack spray unit 33 in stack 18. A flow regulator 34 ensures an even, pre-set flowrate to the stack spray unit 33. In the stack, the processed water is instantly flash vaporized and the vapors flow out of the stack with the engine exhaust effluent.

A pair of water flow control valves 35, 36 are provided in the processed water flow lines 31, 31' and 32, 32', respectively. Valves 35, 36 are two-position valves each connected to three lines for three-way control of the flow. These valves are loosely referred to as three-way valves and are conventional, electrically operated valves having motor units 37, 38, respectively, controllable through electrical circuitry and switches in the control unit 10 via electrical lines 39, 39'. The valve units 35, 36 are operable to establish communication between one fluid line and either of two others. In the case of valve 35, communication may be established between fluid line 31 and either water pressure supply line 40 or pump inlet line 31'. Water pressure supply line 40 is usually connected to the clean water supply of the vessel, and includes a normally-closed solenoid shut off valve 41 connected by electrical line 42 to control unit 10. The purpose of fluid line 40 will be more fully discussed below in connection with a description of how the discharge of oil from the separator is carried out. As illustrated, valve 35 has been actuated to a position where communication is established between water lines 31, 31'. The other position of the valve would connect lines 40 and 31 and close off line 31'. Valve 36 is operable to connect water line 32 to line 32' on the discharge side of pump 24 to permit stack evaporation, or to connect lines 31' and overboard discharge line 43 while closing off line 32. Flow regulator 43' is provided in line 43 as illustrated. Valve 36 is set manually either to a first position (stack discharge) as shown in FIG. 1 where water lines 32, 32' are in communication, or to a second position (overboard discharge) where lines 32' and 43 are in communication. The manual selector 14 is used to control the position of valve 36 to obtain the desired water disposal mode, either by stack evaporation or by dumping overboard. Setting of control knob 14 to overboard discharge during system operation causes signal light 44 to be illuminated.

Valve position comparator sensors 45 and 46 are connected to the valves 35, 36 or to their motors 37, 38, and also to the control unit 10 via electrical lines 47, 48. The comparators 45 and 46 and their associated circuits compare the actual position of the valves 35 and 36 with the command position of the valves during each cycle of operation of the system. If the actual position of either valve 35 or 36 is not in accordance with the position to which it has been commanded by control unit 10, the entire system is shut off, the valve fault light 49 is lit and the system malfunction alarm is sounded. Actually, system shut off is accomplished by shutting off pump motor 23 and allowing valve 41 to return to its normally closed position; the engine 15, obviously, is not shut off.

Operationally at this point, it will be evident that with the system set in the automatic mode, with the engine continuously operating at full power and the stack maintaining a desired temperature, when a high bilge level is sensed at 25, pump 24 will be activated to draw bilge water into the separator 29 through line 30 while it draws processed water out of the separator through line 31, 31', and into water line 32, 32' for flash vaporization in the stack. Alternatively, the processed water could be discharged overboard at any time by turning valve 36 to the overboard discharge position through manual selector knob 14.

The oil separator unit 29 is referred to herein as the inverted dome type. Two embodiments of this type separator are described in U.S. Pat. No. 3,628,660 and British Pat. No. 1,212,553 published Nov. 18, 1970. Units of this type, with various control systems, are commercially available as indicated previously above, and the basic separator unit per se is not considered as being the novel subject matter of the present invention. However, that is not to say that the use of a separator of this type in the system of the present invention is not considered to be novel, since the combination of an inverted dome separator with or without the controls set forth herein and an exhaust stack evaporator in a ship bilge water disposal system is considered to constitute one of the principal novel features of the present invention.

The characteristics of the inverted dome separator 29 lend themselves remarkably well to exhaust stack water disposal aboard a vessel. For example, oil contained in the water drawn into the separator is not emulsified by a pump prior to separation; further mixing of oil and water in the separator due to ship motion is minimized; the separator can handle pure slugs of oil from the bilge; processed water is sufficiently free of oil at the outlet of the separator to meet many requirements respecting freedom of water from oil contaminant; the separator operates well regardless of most impurities or contaminants in the bilge water other than oil; the separator unit is self-cleaning and trouble free with a minimum number of moving parts, and the separator is sufficiently compact to facilitate its installation aboard old ships. The separator can be installed remotely from the pump and valve elements, only requiring connection of fluid lines and electrical connections to the sensors.

An inverted dome separator 29 generally comprises a closed container 60 having an inverted dome or bell member 61 therein which normally rests against lower stop elements 62 at its lowermost position. Rigidly connected to the top of the dome is a link 63 connected to a counterweight arm 64 outside the container 60 which is pivotally attached at 65 to container structure 60. Link 63 extends through the containing 60 through a watertight fitting. Arm 64 includes adjustable weights 66 which can be adjusted to balance the weight of the dome 61 within the fluid of heavier specific gravity to be separated (water in this case) and to regulate the sensitivity of the dome response to oil accumulated beneath the dome. An air eliminator and pressure/vacuum gauge assembly 67 is provided so the separator is maintained completely filled with fluid during operation. In practice, the air separator is connected to the highest point of the tank 60 which is hermetically sealed.

Coalescing screens 68 separate the interior of tank 60 into two chambers, with water to be processed or undergoing processing on the inner side of the screens in chamber 60', and processed water on the other side of the screens in chambers 60''. A feed pipe 69 extends bilge line 30 to the interior area of tank 60 within dome 61, and an oil discharge pipe 70 having an inlet 71 disposed very close to the underside of the top of the dome 61 when the latter is at its lower limit position. Pipe 70 discharges into oil discharge line 70' when the separator is operating to discharge oil 72 collected under the dome 61. Line 70' terminates in oil storage tank 73 which is provided with a high oil storage sensor 74 connected to panel unit 10 by electrical line 75. Indicator light 75' is lit when the oil level in storage tank 73 exceeds a safe limit.

The position of dome 61 varies in response to separated oil collected under the dome, rising as the lighter oil pushes the dome upwardly in the heavier water. In the absence of oil, of course, the dome settles down to its lower limit position. The dome position is sensed by unit 76 which closes or opens appropriate circuitry to provide a signal at control unit 10 of the high and low limit positions of dome 61 via electrical line 77. A drain sump 78 permits sludge to be removed from the bottom of the tank.

A separate function sensing unit 79 in separator chamber 60' is connected electrically to control unit 10 through electrical line 80, and continuously monitors the conductivity of the bilge water undergoing processing in the area beneath the lower edge of dome 61. If the oil content of the water in chamber 60' in the area of the sensor 79 is beyond a certain predetermined concentration, sensor 79 enables control unit 10 to recognize this fact and to shut the system down due to separator malfunction. Separator fault light 81 is illuminated when this occurs, along with the sounding of an alarm. Unit 79 also could be located at the top of tank 60, or any other location where best sensitivity to malfunction is found.

Oil separator operation is as follows: operation of pump 24 draws bilge water into separator tank 60 under the dome 61 through pipes 30 and 69, as processed water is pumped out of chamber 60" via processed water outlet line 31, 31'. Oil in the bilge water floats up to the water-dome interface under dome 61 or, if it is in fine suspension in the bilge water, collects on screens 68 until larger oil globules form, the globules rising to the top of the dome underside due to the different specific gravities of the oil and water. A layer of oil 72 then builds as separation proceeds, causing dome 61 to gradually rise to an upper limit which is sensed by unit 76. Until this limit is reached, with the system in the "automatic" mode of operation, processed water will continuously be removed from the separator while the oil level 72 builds and dome 61 rises.

Upon detection by unit 76 that the dome has reached its upper limit, the system operation is changed to "oil discharge" mode. At this time, pump motor 23 is stopped, water flow control valve 35 is automatically moved to its outer position to establish communication between fluid lines 40 and 31, and solenoid valve 41 is opened to admit water under pressure to chamber 60". Check valve 82 prevents flow of water to bilge 30', so oil 72 begins to flow out of pipe 70 and 70' under influence of incoming water through line 31. As the thickness of oil layer 72 decreases, dome 61 lowers towards its lower limit. At the lower limit position, sensor unit 76 transmits a signal to control unit 10 causing deactivation of valve 41 to effect its return to the normally closed position; valve 35 is turned back to its position shown in FIG. 1, and pump 24 is reactivated if a high bilge level is sensed at 25. The system continues to cycle in this manner as long as it is turned on and all function monitors sense satisfactory operation of the various elements of the system. The signal light 83 is illuminated whenever the system is operating in the "oil discharge" mode.

A graphic, time based recorder unit 90 is provided in control unit 10. Signals from various units in the system are combined in the unit 10 to enable recordation of when mode selector knob 11 is in "off" position; when the system is in the "stack" water discharge mode with the pump running; when the pump is not running; and when the system is in the overboard discharge mode with the pump running. The designation "to recorder" in FIG. 1 shown connected to electrical lines 39', 23" indicate two sources of signals to be processed for recordation. The third signal is derived from the position of mode switch 11 on panel unit 10. From the pump running signal, the mode switch signal and the stack or overboard signal, the four recordations indicated above can be derived in a conventional manner.

The control panel 10 includes an "alarm acknowledgement" button 91 which turns off the alarm sound, while the "alarm reset" button 92 resets the various alarm and sensor mechanisms in the system after a fault or malfunction has been corrected.

With the setting of control knob 11 set to "bilge intake" mode rather than "auto", and the water discharge control knob 14 set to "overboard", the system operates continuously to dispose of processed bilge water overboard the ship, and independently of engine operation or stack temperature. With the knob 11 set to "oil discharge", valve 35 is shifted to connect lines 40 and 31 and valve 41 is opened to cause water backflow through screens 68 and outflow of oil 72 from the separator 29 to the storage tank 73. Valve 41 is automatically closed when dome 61 drops to its lower limit position. The knob 11 can also be set to "off" which deactivates most of the system. With knob 11 in the "off" position, however, a high bilge level will be indicated at 25a when it occurs and suitable other signals may be arranged to be in an active status.

With reference to FIGS. 2a and 2b, which together show the control system of the invention in more detail, and wherein like elements are numbered the same as in FIG. 1, the stack, stack fault, overboard circuits are illustrated in box 100. Input signals to circuits 100 are obtained from the fuel oil pressure sensor, engine throttle air pressure sensor, and stack temperature sensor, all through lines 20, 19 and 22, respectively. Stack overboard switch position is sensed through lead connector 101. Overboard light 44, "stack evap. fault" light 27 and "stack evap. O.K." light 28 are connected to box 100 through leads 102, 103 and 104, respectively, Output signals indicative of stack evaporation or overboard discharge setting of switch 14 are fed to recorder 90 via lead 105. Stack evaporation fault signals are transmitted to the remote unit alarm circuit box 110 via line 106. A stack evaporation O.K. or enable signal is tranmitted through line 107 to pump motor circuit box 120, and a valve position command signal is transmitted to valve 36 through line 39'.

Circuits 100 process the incoming signals and monitor the internal operation of the circuits and various relays in the circuits 100 in such a manner that stack evaporation is permitted only when a particular sequence of events occurs and a particular set of operating conditions are maintained. Upon engine starting, the fuel oil pressure (FOP) sensor almost immediately closes (the term "close" signifying completion of a circuit indicating the occurrence of a condition to be sensed by the sensor) indicating that the engine is running. The circuits 100 immediately then look at the condition of the throttle air pressure (TAP) sensor. Since a marine diesel engine cannot be normally started at a full throttle position, the condition of the TAP sensor should be "open" (circuit open-condition not sensed). If the TAP sensor is closed when FOP closes, a malfunction is indicated, faulting the circuit and preventing a pump run enable signal to be outputted until the condition is corrected. If the circuit remains faulted with the throttle position at less than full power, a sensor or circuit malfunction is indicated. However, if conditions are correct, the FOP sensing circuit closes and TAP circuit remains open until the throttle is advanced to full power setting. The TAP circuit then closes, resulting in both FOP and TAP circuits being closed in proper sequence. The exhaust stack temperature (EST) then gradually comes up to minimum desired flash evaporating temperature. A time delay in the circuits 100 of a predetermined duration prevents a stack evaporation enable signal to be transmitted to the pump control circuits until this time period has occurred to prevent transitory conditions from starting the pump running and to allow the stack temperature to stabilize. After the time delay, pump operation and stack evaporation is enabled through circuits 100 via lead 107. Of course, if the switch 14 is in the overboard discharge position, the stack evaporation signal at lead 107 becomes a pump run enable signal and engine or stack conditions do not affect the signal, only the position of switch 14 affecting this signal. Stack evaporation is thus enabled until a malfunction faults the circuits 100, or until the operating conditions indicative of full power engine operation cease to exist. If any of the FOP, TAP, or EST circuits open, stack evaporation and pump motor operation are disabled immediately.

To guard against a stuck EST sensor, a further check is made in circuits 100 if the EST sensor remains closed after the TAP sensor has opened after a predetermined time delay. If EST sensor does not open within a certain time after the TAP sensor is opened, the circuits are faulted and stack evaporation will not be enabled via lead 107. Whenever any stack evaporation is faulted, lamp 27 is lit. The "stack evap. O.K." lamp 28 is lit when stack evaporation is enabled. The remote alarm system receives a stack fault signal also to sound an alarm when a fault occurs and to indicate the malfunction. Overboard discharge lamp 44 is lit when switch 14 is in the overboard position and valve motor 38 at valve 36 is commanded and controlled via lead 39' in response to position of switch 14 through circuits 100.

Remote unit alarm system circuit 110 receives malfunction or alarm signals of high oil level in the storage tank via lead 116 from high oil level storage circuit box 115; a separator malfunction signal through lead 161 from fault detector circuit box 160; and a valve fault signal from lead 131 connected to valve position comparator circuit 130. The remote unit system circuit 110 is also connected to a remote alarm unit 111 through output line 112, the remote unit being located anywhere in the vessel remote from the control panel unit 10 and where a separator malfunction and audible alarm is desired, such as in the pilot house or bridge, for example. An engine room horn can be connected to the remote unit alarm circuit box through lead 113. The circuit 110 processes the incoming alarm or fault circuits for transfer to the remote alarm and indicator 111, 113, shown in FIG. 2b. Indicators and horns are incorporated in the remote alarm unit 111.

The high oil storage level circuit 115 receives input signals from high oil level sensor 74 in oil storage tank 73 via lead 75, and processes the signals to output a high oil level signal through lead 116, and to energize indicator lamp 75' through lead 117 when a high oil level condition occurs.

Valve position comparator circuit 130 receives input signals from valve command signal leads 39 and 40 as well as valve position signal leads 47 and 48. These input signals are processed to produce valve fault alarm signal in lead 131 if the actual positions of the valves 35, 36 do not conform to their command positions. Valve fault lamp 49 is energized via lead 132 when such a valve fault occurs.

Pump control circuit 120 receives stack evaporation enable signals from circuits 100 via lead 107; valve fault signals from valve position circuits 130 via lead 131; a pump run enable signal from intake-discharge control circuit 140 via lead 141; a pump run enable signal from bilge control circuits 150 via lead 151; and a separator fault signal from circuit 160 via lead 161. The output of pump control circuit 120 includes a pump control signal for directly controlling operation of pump motor 23', this signal being carried by lead 23''; and a pump running signal carried by lead 123 for transmitting pump running signals to circuits 140 and 150.

Pump motor 23 will operate if the manual mode switch 11 is either in "bilge intake" or "auto" position and the power switch is on if the pump enable signals required for each mode of operation are all sensed at the pump control circuit 120. Otherwise, operation of the pump will not be enabled and bilge or processed water will not circulate through the system.

In the "bilge intake" mode, pump motor 23 is enabled when the high bilge sensor 25 senses a high bilge level, and not enabled when the low bilge sensor 25' senses a minimum bilge level. Operation of the motor will only be permitted, however, if enabling signals from the separator fault detector 160, intake-discharge control circuits 140, and valve position comparator circuit 130 all are providing pump run enable signals. Obviously, it is desired to prevent the pump from sucking up air, so a minimum bilge level is maintained to avoid this. Whenever the bilge level drops below the minimum level, pump operation is not enabled.

In the "bilge intake" mode, the operating condition of the engine or exhaust stack is inconsequential, since the purpose of this mode selection is to enable overboard discharge of processed bilge water when the engine is off or the exhaust duct is otherwise not in proper flash evaporating condition. Selector knob 14 would normally be in the "overboard discharge" position when "bilge intake" mode is selected.

In the "auto" mode of system operation, pump operation requires, in addition to the enable signals mentioned above, an enabling signal from the stack fault circuits 100 via lead 107, the source of this signal and its nature having been described above.

The bilge control circuit 150 receives the signals of high and low bilge levels through leads 26, 26', from sensors 25, 25' in the bilge of the vessel. The high bilge signal light 25a is illuminated through circuit 152 and a high bilge signal 153 transmitted to the remote unit 111 whenever a high bilge level is sensed and a pump running signal is not transmitted through lead 123 from the pump control box 120. The bilge control circuit 150 processes the bilge sensor signals to output a pump run enable signal through lead 151 transmitted to pump control circuit 120.

The intake-discharge control circuits at box 140 receive input information signals of high and low separator dome levels through leads 77, and a high oil storage level signal through lead 116. Switch 11 is connected to circuits 140 through leads 142. The intake-discharge control circuit 140 further transmits valve open command signals when appropriate to solenoid valve 41 via lead 42. Oil discharge signal lamp 82 is activated via line 143 whenever valve 41 is turned to the oil discharge position and the solenoid valve 41 is opened. This could occur either automatically when the circuits 140 process inputted information from the dome level sensors 76 to shut the pump 23–24 off and to open solenoid valve 41; or when manual switch 11 is set to "oil discharge" position as seen in FIG. 1, which automatically shuts off motorpump unit 23–24 if it is running and opens solenoid valve 41. In each instance that opening of solenoid valve 41 occurs, valve 35 is turned automatically by circuits 140 to oil discharge position which enables communication between water lines 40 and 31. Bilge water intake lamp 144 connected to circuits 140 via lead 145 is lit whenever valve 35 is turned to the "bilge intake" position. Circuits 140 receive a pump running signal when appropriate through lead 123.

System fault detector and alarm circuits at box 160 sense the operating condition of separator 29 through probe unit 79 via lead 80. The water in the area just beneath the dome and just above the separator screens of the separator 29 should not have more than a certain percentage of oil contained therein if separator 29 is operating properly. A conductance probe or other suitable means for sensing an oil content in the bilge water in this area of the separator in excess of a certain range is used with appropriate circuits at 160 to detect and transmit a signal indicative of separator system malfunction or fault to deactivate or prevent operation of pump 23-24 and illuminate signal light 81 via lead 162. The probe 79, of course, could also be located at the top of tank 60 to detect excess oil in the water being processed that escapes around the lower edge of the dome 61.

Recorder 90 receives information as to whether the system is operating in the "stack" or "overboard" water discharge mode from line 105 connected to stack and overboard circuits 100; and also receives pump running signal and position signals of manual mode switch 11, as indicated in FIG. 2b. As described previously, appropriate circuits process the incoming signals to provide recordation of one of four functions at any point in time; mode switch "off"; stack discharge with pump running; pump not running; and overboard discharge with pump running.

In FIG. 3, a preferred control panel face 170 contemplated for use with control unit 10 of FIG. 1 is illustrated in more detail. Various options are available, of course, and additional indicator lights may be provided to show such functions as engine throttle air pressure O.K., engine fuel pressure O.K., as well as other indications. The lamp test button 180 is provided also as a check for lamp burn out in the panel, this being conventional in control panels of this type. The other indicators and controls on the panel face are numbered similarly to their counterparts in FIGS. 1, 2a and 2b.

The operation of the system will now become evident in view of the above description and with reference to the drawings. With the power switch 13 on and the mode switch 11 set in any position, including "off", the high bilge light 25a will be lit whenever high bilge sensor 25 detects a predetermined level of bilge water in the bottom of the vessel. If the mode selector switch is in "off" position, nothing in the system will function to dispose of the bilge water. The recorder 90, meanwhile, will be recording the fact that the switch 11 is in the "off" position.

If the operator of the vessel desires to pump out the bilge and dispose of the processed water overboard, he turns switch 11 to the "bilge intake" position and turns water discharge control knob 14 to the "overboard" position. Pump motor 23 will then be activated to pump bilge water up into the separator and processed water out of the separator and overboard through line 43. Valve 36, of course, will be turned to enable communication between water line 32' and overboard line 43. The pump motor will continue to operate until a low bilge level is detected at 25'; the level of the dome 61 in the separator 29 reaches its upper limit; either valve 35 or 36 is not in its proper position or a separator fault is detected by probe 79. Assuming no valve or separator fault, the normal operation of the system would simply result in the bilge being pumped out, with oil being separated from the bilge water in the separator unit and the processed clean water discharged overboard, with or without a final filtration. While water is being discharged overboard, the indicator light 44 is lit and the recorder 90 records the time of overboard discharge. The pump would autmoatically shut down when the bilge has been pumped out to a predetermined low level and would start up again upon the detection of a high bilge fluid level. If sufficient oil becomes separated from the bilge water, the level of the dome 61 in the separator 29 may reach its upper limit, in which case the high bilge indicator 25a would be on but the pump running signal 23' would not be on.

To discharge oil 72 from under the dome 71, the operator turns knob 11 to the "oil discharge" mode, in which case valve 35 is rotated to cause lines 40 and 31 to be in communication and causes opening of solenoid valve 41 to admit fresh water supply to the interior of the separator unit. Admission of water from line 40 into the separator backwashes the screens 68 and causes oil 72 beneath the dome 61 to be discharged through pipe 70 and line 70' into oil storage tank 73. This causes lowering of the dome 61 to its lower limit position when most of the oil has been discharged, causing the oil discharge control circuits 140 to close solenoid valve 41 and return valve 35 to the position shown in FIG. 1 for allowing communication between fluid lines 31 and 31'. During the "oil discharge" operation, no water is disposed of either through the stack evaporator or the overboard line.

If excessive oil is detected at sensor 79 during any stage of operation of the system, the pump motor 23 and the solenoid valve 41 are respectively shut off and closed so that the system returns to a dormant status. Likewise if the oil level in the oil storage tank 73 exceeds a safe level, this being indicated at the "high oil" indicator 75', the solenoid valve 41 will be closed and valve 35 returned to the bilge intake position, disconnecting lines 40 and 31 to prevent further discharge of oil from within separator 29. Power failure in the system will always cause solenoid valve 41 to close if it is open to prevent discharge of oil or separator flooding.

Operation of the system with the knob 11 set in the "auto" position proceeds as follows. With power switch 13 on, the engine is started if it is not already running and the engine throttle is advanced to the full power position. Assuming that the sequencing of events described previously in connection with stack fault circuits 100 occurs, stack evaporation will be permitted when the exhaust stack temperature reaches its minimum desired flash evaporation temperature and no fault signal is being generated in the system. Upon the occurrence of a high bilge condition, the pump is started and bilge water is drawn up into the oilwater separator for processing, while processed water is pumped to the stack for flash evaporation. The pump will continue to run, assuming all of the pump operation enabling signals are being generated until a low bilge level is sensed, at which time pump operation and stack evaporation of processed water will cease. Upon the subsequent occurrence of a high bilge level, the pump operation cycle will again be repeated. Whenever the dome 61 of the separator reaches its high level position, the pump will be automatically deactivated if it is running, and the system will go into the oil discharge mode of operation as previously described, with valve 35 being rotated and solenoid valve 41 opened to enable water supply under pressure to be admitted to the interior of the oil-water separator. This will cause discharge of oil to the oil storage tank, lowering of the dome until its low limit position is reached and finally the return of valves 35 and 41 to their original positions to enable continued pumping of processed water to the exhaust stack when conditions are correct for stack evaporation. The water discharge control element 14 may be turned to the "overboard" position with the mode selector switch in the "auto" position. This will result in processed water being pumped overboard through water line 43 regardless of the operating condition of the engine and the temperature of the exhaust stack.

As an example of the operation of the system of the present invention during preliminary experimental trial runs, an inverted dome separator manufactured by Hydrovac Systems International was modified to incorporate the high and low dome position sensors of the present invention and equipped with a conductance probe as indicated at 79 in FIGS. 1, 2a and 2b. The separator was rated at 4 to 5 gallons per minute (gpm). The flow regulator valves 34 and 43' were adjusted to let 1 to 1.5 gpm flow to the stack duct from pump 24. That is, the separator was utilized at a lower output than its rated capacity to ensure a low oil content in the processed water until the entire system was adjusted and balanced. The engine was rated at 350 h.p. and, at full power, produced exhaust gases that stabilized at a temperature of about 612° F during the stack evaporation process, slightly higher before evaporation was begun. The oil constituent of the bilge water was 8% lube oil having a specific gravity of between 0.88 and 0.935. The processed water was found to have an oil content of less than 2 ppm during one test run and was successfully falsh vaporized in the engine exhaust stack for the duration of the test at a flow rate of at least 1 gpm. No adverse effect on the exhaust stack was observed and the system appeared to monitor all its functions in the intended manner. Occasional higher oil concentrations in the processed water (up to 30 or 40 ppm) during other test runs were not found to adversely affect the stack evaporation process. Accumulated oil was removed from the separator in the manner set forth in the description above, and the system was found to function effectively in the overboard discharge mode.

While the system incorporating the present invention has been described in connection with a preferred embodiment comprising a shipboard bilge disposal system, the present inventive concept is considered to be limited solely by the claims attached hereto. The invention can be readily used for disposing of fluid mixtures of different specific gravity than oil and water, and the total separation and evaporation system could be used to dispose of such a mixture originating from a source other than the bilge of a floating vessel.

We claim:

1. The method of disposing of water by injecting and vaporization of same in the exhaust duct of an internal combustion engine comprising:
   a. operating the internal combustion engine to cause flow of hot exhaust gases in the exhaust duct of the engine;
   b. sensing sequentially via a control system whether the engine is operating or not; the power level setting of the engine; and the temperature of engine exhaust gas in the vicinity of the duct where the water is injected;
   c. under regulation of the control system, injecting water into the duct only after sequentially sensing that the engine is operating; that the power level setting is at a predetermined setting; and the exhaust gases flowing through the duct in the vicinity of where the water is injected is at a desired minimum flash vaporization temperature; and preventing flow of water to the duct if the foregoing recited sequence of events and conditions is not sensed, and if any one or more of the events or conditions ceases to be sensed after flow of water to the duct has begun.

2. In a flash vaporization water disposal system wherein vaporization is carried out by directly injecting processed water into the exhaust gas duct of an internal combustion engine, and including a means for controllably supplying a flow of water to the exhaust gas duct, an improved water flow control system comprising means for sensing whether the engine is operation or not; means for sensing the power level setting of the engines; and means for sensing the exhaust gas temperature in the exhaust duct; and further including means for disabling flow of water to the exhaust duct unless and until at least engine operation and a predetermined exhaust gas temperature are sequentially sensed in the recited order by the respective sensing means, whereby a premature and false sensing of the predetermined exhaust gas temperature before a sensing of actual engine operation will be indicative of a malfunction in the sensing system, and such disablement will prevent inadvertent supply of water to the exhaust duct under improper operating conditions.

3. The control system of claim 2, further including means for disabling water flow to the exhaust duct unless and until a predetermined power level setting of the engine is sensed between the sensing of actual engine operation and the sensing of the predetermined exhaust gas temperature, whereby actual engine operation, predetermined engine power level setting, and predetermined exhaust gas temperature must be sequentially sensed in the recited order before water flow to the exhaust duct is enabled to prevent inadvertent supply of water to the exhaust duct when conditions are not proper due to a fault in the various recited sensors.

4. The control system of claim 3, further including a means for sensing the occurrence of the predetermined exhaust gas temperature for a specific time interval, and further including means for disabling the water flow to the exhaust duct unless and until said time interval has elapsed.

5. The control system of claim 4 further including means for disabling the water supply means if a drop in exhaust temperature below the predetermined temperature is not sensed within a pre-set time interval following an absence of sensing of the predetermined power level setting of the engine, after such power level setting has been once sensed and the means for supplying water to the exhaust duct has been once enabled.

6. The control system of claim 3 wherein said pump is driven by an electric motor; a power supply for the electric motor; said sensing means are electrically operated; and said water flow disabling means includes a circuit interrupter between the power supply and the motor.

7. The control system of claim 2, wherein means for supplying water to the exhaust duct is a motor driven pump.

* * * * *